Jan. 28, 1969

M. L. STITT 3,424,145

GRILL LINER

Filed Nov. 28, 1966

Mary Lou Stitt
INVENTOR.

BY *Clarence A. O'Brien*
and *Harvey B. Jacobson*
Attorneys

Mary Lou Stitt
INVENTOR.

United States Patent Office 3,424,145
Patented Jan. 28, 1969

3,424,145
GRILL LINER
Mary Lou Stitt, 1008 Ohio Ave., Monaca, Pa. 15061
Filed Nov. 28, 1966, Ser. No. 597,349
U.S. Cl. 126—25　　　　　　　　　　　　7 Claims
Int. Cl. F24b 3/00; A47j 37/07; F23h 13/00

ABSTRACT OF THE DISCLOSURE

A non-combustible liner for grill fire bowls comprising a sheet-like body configured to the interior shape of a fire bowl and provided with radially extending corrugations defining upper and lower air passages extending inwardly from the peripheral edge of the liner completely thereabout. The liner is provided with apertures communicating the lower air passages with the top of the liner and hence combustible fuel supported thereon. The liner can be reinforced by a subjacent network of thin relatively rigid reinforcing wires.

---

The instant invention generally relates to outdoor braziers or portable grills, and is more particularly concerned with a removable liner for such grills.

It is a primary object of the instant invention to provide a liner for the interior of the fire bowl of a grill with the liner being so constructed as to enable the obtaining of the maximum degree of heat from the particular fuel being utilized, normally charcoal briquettes or the like, while at the same time protecting the fire bowl of the grill itself.

In conjunction with the above object, it is a significant object of the instant invention to make the liner of a suitable non-combustible material, such as for example sheet aluminum, which presents a reflective upper surface resulting in a greater and more evenly distributed heat.

Another significant feature of the instant invention resides in the provision of a liner which, in addition to protecting the interior of the grill itself, will assist in maintaining the grill clean and be capable of independent removal from the grill for a disposing of the briquettes or the like.

Also, a significant object of the instant invention is to provide a grill liner which acts in the manner of a grate in that specific air passages are provided below the supported fuel in a manner so as to ensure a continuous flow of combustion supporting air below and around the briquettes.

Furthermore, it is a significant object of the instant invention that the liner be so constructed as to achieve the maximum rigidity and stability from a relatively thin sheet of material, this being effected by the utilization of elongated corrugations which will also provide the desired air flow passages.

In addition, another object of the instant invention is the provision of a unique grill liner wherein the relatively thin material thereof is additionally stabilized by a thin wire reinforcing unit intimately supplied therewith.

Basically, in achieving the above objects, it is contemplated that the grill liner of the instant invention consist of a relatively thin sheet of non-combustible material, preferably aluminum, corrugated throughout the extent thereof. These corrugations, assuming a circular liner, will extend radially outward from a center aperture which will be provided for the accommodation of the support and raising mechanism for the overhead food supporting rack. The corrugations in the sheet define a series of ridges and valleys which provide elongated air passages extending inwardly from the outer periphery of the sheet-like body which in turn allows for a flow of air beneath the fuel, for example briquettes, which will be supported in slightly raised positions due to the relatively close nature of the adjacent ridges. Further, the sheet-like body will be provided with a series of holes therethrough whereby air flowing through the downwardly directed valleys under the body can pass freely upward through the sheet and about the ignited fuel. The sheet will be additionally rigidified through the utilization of a reversely turned peripheral edge, and, in some instances, through the provision of an underlying network of support wires which may be either permanently affixed to the sheet-like body or independent thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
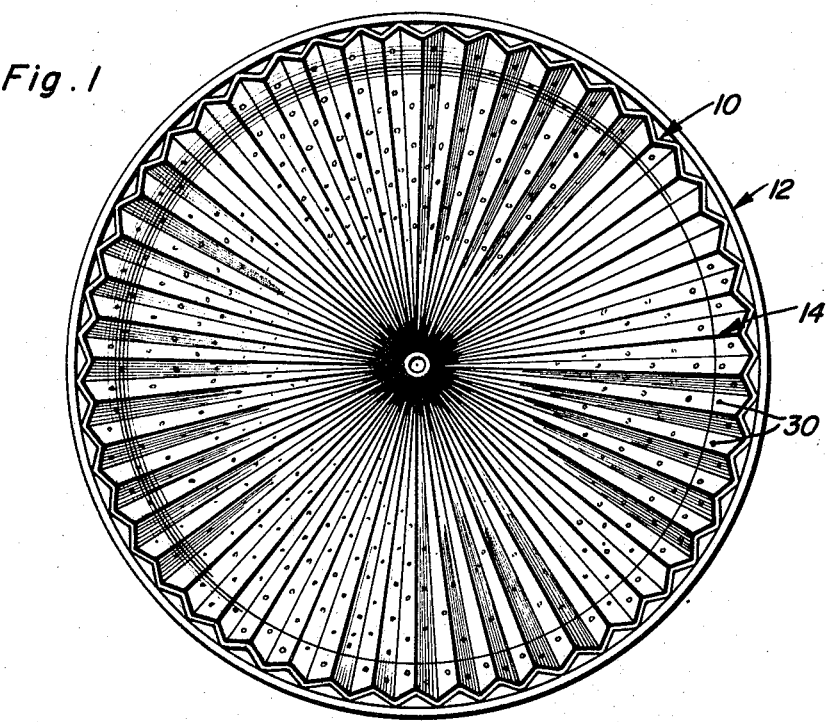
FIGURE 1 is a top plan view of the grill liner of the instant invention mounted within a grill fire bowl.

Referring now more specifically to the drawings, the reference numeral 10 is used to generally designate the grill liner comprising the instant invention. While this liner has been illustrated as being circular with upwardly and outwardly curving outer ends so as to conform to a similarly shaped grill fire bowl 12, the particular shape of the liner can be modified so as to accommodate different shaped portable grill bowls, such as square or rectangular bowls.

Figure 2:
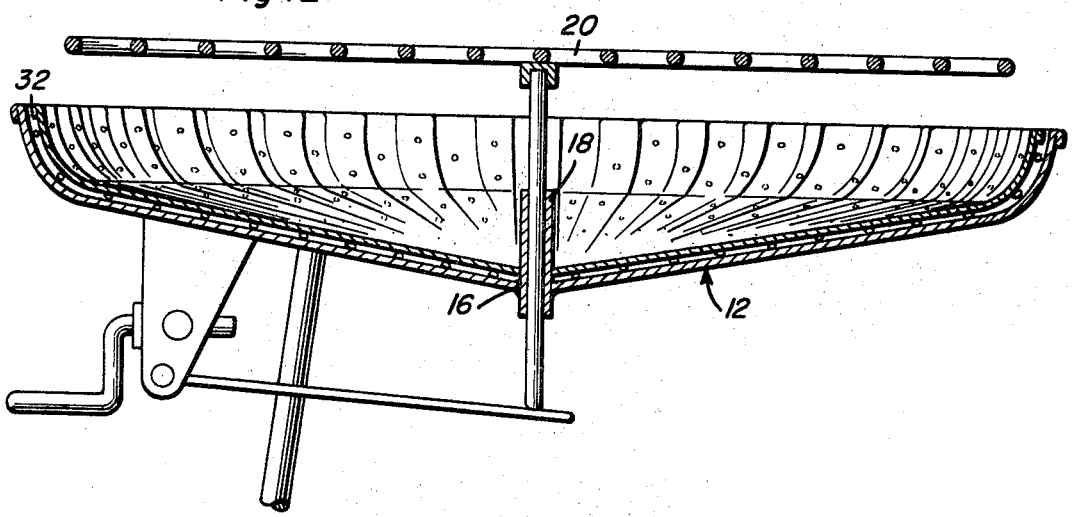
FIGURE 2 is an enlarged cross-sectional view through the upper portion of a portable grill having the liner of the instant invention mounted therein.
Figure 3:
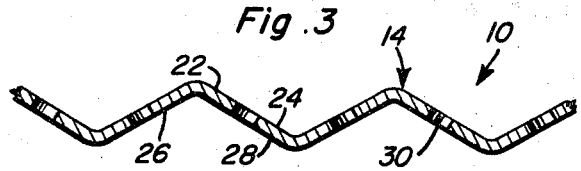
FIGURE 3 is an enlarged partial cross-sectional view illustrating a portion of the corrugated and perforated body defining sheet of the liner.
Figure 4:
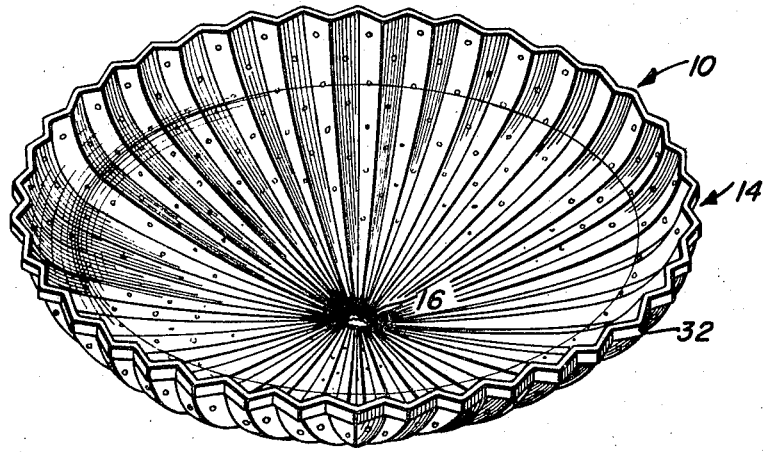
FIGURE 4 is a perspective view of the liner per se.

The liner 10, as will be appreciated from the drawings, is to be made of a relatively thin sheet of material provided with elongated corrugations completely thereabout, these corrugations, in the illustrated liner 10, projecting radially outward from a central aperture or hole 16 defined in the grill for reception about the centrally provided support construction 18 for a conventional overhead food rack 20 which, as illustrated in FIGURE 2, may be vertically adjustable.

The series of radial corrugations 14 provided circumferentially about the liner 10 define alternating upwardly directed ridge portions 22 and valley portions 24 with corresponding complementary downwardly directed valley portions 26 and ridge portions 28. The grill liner 10 will be positioned within the fire bowl 12 of a grill as illustrated in FIGURE 2 with the ignitable fuel, such as charcoal briquettes, being then placed within the liner 10 for ignition. Because of the relatively close positioning of the upwardly directed corrugation ridges 22, the briquettes or the like will tend to be maintained in a slightly raised position, thereby allowing for the use of the upwardly directed radial valleys 24 as air passages whereby air may flow throughout the surface of the grill 10 beneath the briquettes so as to effectively support combustion. In addition to this, the downwardly directed valleys 26 defined in the under or lower surface of the liner 10 will also provide highly effective air flow passages with the air flowing therethrough passing through a series of apertures or holes 30 provided through the sheet forming liner body. In this manner, an additional and highly effective combustion supporting flow of air about the ignited fuel is ensured. Thus, it will be appreciated that not only does the grill liner provide an effective protective surface for the interior of the fire bowl 12 of the grill, and a means for easily removing the fuel after the use thereof, but also acts in the nature of an effective grate for the support of the fuel in a manner whereby ample air is provided to support the desired combustion. Also, it is contemplated that at least the upper surface of the liner 10 be of a reflective nature which, in conjunction with the relatively angular construction of the corrugations 14, provides for a high degree of heat reflectibility, thereby ensuring a maximum ultilization of the heat of the fuel and an even dispersing of this heat below the food rack 12.

Figure 5:
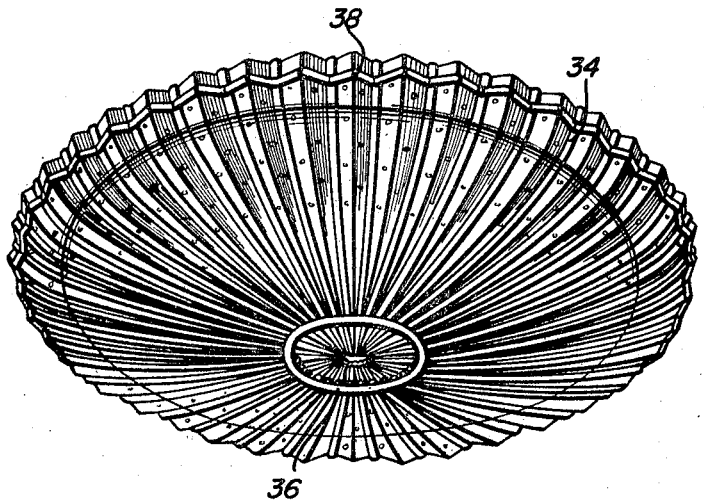
FIGURE 5 is a bottom perspective view of a slightly modified form of liner incorporating the reinforcing wire unit.
Figure 6:
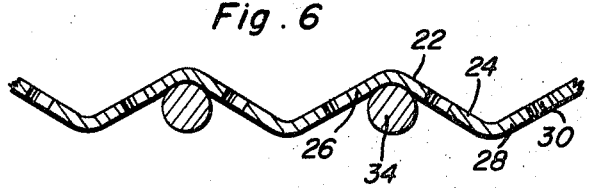
FIGURE 6 is an enlarged cross-sectional view through a portion of the liner of FIGURE 5.

While the corrugated construction of the liner 10 ensures a substantial degree of rigidity, regardless of the thin nature of the sheet-like liner 10, it is contemplated that additional rigidity be introduced thereinto by a reverse bending of the peripheral edge 32 completely thereabout. In addition, and with particular reference to FIGURES 5 and 6, it will be noted that a support network of wires can also be provided. This will normally consist of a plurality of radially extending wires 34 nesting within the downwardly directed valleys or valley portions 26 and interconnected with each other, so as to define a single unit, in any suitable manner such as inner and outer annular wire bands 36 and 38. The liner 10 itself can, if deemed desirable, either be permanently adhered to the support wires 34, 36 and 38, or removably mountable therein so as to enable a utilization of the same wire unit with many replaceable liners 10.

From the foregoing, it should be appreciated that a unique grill liner has been defined, this grill liner incorporating, through the unique construction thereof, significant features which provide for a maximum utilization of the combustible fuel in conjunction with a protective means for the grill fire bowl itself and a means for enabling a convenient removal of the exhausted fuel and a cleaning of the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grill liner positionable and self-supporting within the fire bowl of a grill for the reception of ignitable fuel, said liner having an enlarged bowl-shaped sheet-like body with an upwardly directed peripheral edge portion, a plurality of elongated alternate ridge and valley defining corrugations formed radially in said body and extending from a substantially common central area to and including the peripheral edge of the body, said corrugations providing air passages through the periphery of the body and radially inward into the confines of said liner and below the upper portions of the ridges which are adapted to support ignitable fuel thereon, thereby enabling a flow of combustion supporting air about received fuel, each of said ridges defining a corresponding subjacent valley in said body, these subjacent valleys defining air flow passages beneath said body, and air flow permitting apertures defined in said body and communicating said subjacent valleys with the fuel supporting superjacent ridges.

2. The liner of claim 1 wherein said body is generally circular in shape and defines a central hole for a food rack support, said corrugations extending radially outward from said central hole.

3. The liner of claim 2 including reinforcing means underlying said body and generally conforming thereto.

4. The liner of claim 3 wherein said reinforcing means comprises a plurality of elongated relatively rigid wire-like members, one received within and extending longitudinally along each of said subjacent valleys.

5. The liner of claim 4 including inner and outer annular wire-like members interconnecting the opposed ends of the first-mentioned wire-like members and defining a single support unit.

6. The liner of claim 2 wherein the peripheral edge is reversely bent for rigidification purposes, said reversely bent edge following the corrugated configuration of the body.

7. In combination, a grill fire bowl having an upturned edge portion peripherally thereabout, and a bowl-shaped grill liner conforming in shape to the interior of said bowl, including an upstanding peripheral edge portion configured to that of the bowl, said liner having a series of radially extending corrugations defined completely thereabout and extending from a central area through the peripheral edge of said liner, said corrugations defining, on both the upper and lower surface of the liner, alternating ridges and grooves, said liner being received within and supported directly on the inner surface of said bowl, the ridges defined on the lower surface of the liner directly engaging the inner surface of the bowl and retaining the grooves defined on the lower surface of the liner in elevated position above the inner surface of the bowl so as to form radial air flow passages between the bowl and the liner, and air flow permitting apertures defined through said liner for communicating the grooves in the lower surface of the liner with the area immediately above the liner.

References Cited

UNITED STATES PATENTS

| | | | |
|---|---|---|---|
| D. 27,876 | 11/1897 | Smith. | |
| 277,754 | 5/1883 | Lucas | 126—152 |
| 667,013 | 1/1901 | Hull | 110—12 |
| 1,497,490 | 6/1924 | Dullmann | 126—152 |
| 2,247,612 | 7/1941 | Haislip. | |
| 2,943,557 | 7/1960 | Suehlsen | 126—25 X |
| 3,191,591 | 6/1965 | Bennett | 126—152 X |
| 3,327,697 | 6/1967 | Berlant | 126—25 |

FREDERICK KETTERER, *Primary Examiner.*

U.S. Cl. X.R.

126—152.